United States Patent
Fukuri et al.

(10) Patent No.: US 10,619,005 B2
(45) Date of Patent: Apr. 14, 2020

(54) METHOD FOR PRODUCING BINDER RESIN COMPOSITION

(71) Applicant: KAO CORPORATION, Tokyo (JP)

(72) Inventors: Norihiro Fukuri, High Point, NC (US); Christopher Johnson, Jamestown, NC (US)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 16/114,437

(22) Filed: Aug. 28, 2018

(65) Prior Publication Data

US 2019/0161575 A1 May 30, 2019

Related U.S. Application Data

(60) Provisional application No. 62/590,439, filed on Nov. 24, 2017.

(51) Int. Cl.
*G03G 9/087* (2006.01)
*C08G 63/676* (2006.01)

(52) U.S. Cl.
CPC ....... *C08G 63/676* (2013.01); *G03G 9/08755* (2013.01); *G03G 9/08795* (2013.01)

(58) Field of Classification Search
CPC .......................... C08G 63/676; G03G 9/08755
See application file for complete search history.

(56) References Cited

U.S. PATENT DOCUMENTS

| 2005/0003290 A1* | 1/2005 | Kameyama | G03G 9/08755 |
| | | | 430/108.23 |
| 2015/0301467 A1 | 10/2015 | Moffat et al. | |

FOREIGN PATENT DOCUMENTS

| JP | 2009-69827 | 4/2009 |
| JP | 2009-192694 | 8/2009 |
| JP | 2016-114829 | 6/2016 |

\* cited by examiner

*Primary Examiner* — Thorl Chea

(74) *Attorney, Agent, or Firm* — Oblon, McClelland, Maier & Neustadt, L.L.P.

(57) ABSTRACT

Embodiments of the present invention are concerned with a method for producing a binder resin composition, from which a toner having excellent low-temperature fusing property, heat-resistant storage stability, durability, and image density is obtained, a binder resin composition, and a toner for development of electrostatic images including the binder resin composition.

Embodiments according to the present invention are concerned with the following [1] to [3].

[1] A method for producing a binder resin composition including the following steps (1) and (2):
step (1): mixing an aromatic alcohol $A_1$ including an alkylene oxide adduct of bisphenol A and at least one carboxylic acid compound selected from fumaric acid and maleic acid; and
step (2): further adding an aromatic alcohol $A_2$ including an alkylene oxide adduct of bisphenol A to the mixture obtained in the step (1) and mixing, wherein
the binder resin composition includes a polyester resin having an acid value of 14 mgKOH/g or more and 30 mgKOH/g or less, and a total content of fumaric acid and maleic acid is 700 ppm by mass or less relative to the binder resin composition; and
in the steps (1) and (2), a total amount of fumaric acid and maleic acid is 95 parts by mol or more and 105 parts by mol or less on the basis of 100 parts by mol of a total amount of the aromatic alcohol $A_1$ and the aromatic alcohol $A_2$.

[2] A toner for development of electrostatic images, including the binder resin composition obtained by the production method as set forth in [1].

[3] A binder resin composition including a polyester resin that is a polycondensate of an alcohol component including an alkylene oxide adduct of bisphenol A and a carboxylic acid component including at least one carboxylic acid compound selected from fumaric acid and maleic acid, wherein
the polyester resin has an acid value of 14 mgKOH/g or more and 30 mgKOH/g or less, and
in the binder resin composition, a total content of fumaric acid and maleic acid is 700 ppm by mass or less relative to the binder resin composition, and a total amount of fumaric acid and maleic acid is 95 parts by mol or more and 105 parts by mol or less on the basis of 100 parts by mol of a total amount of the alcohol component.

9 Claims, No Drawings

METHOD FOR PRODUCING BINDER RESIN COMPOSITION

FIELD OF THE INVENTION

The present invention relates to a method for producing a binder resin composition to be used for a toner for development of electrostatic images, which is used for development of latent images formed in an electrophotographic method, an electrostatic recording method, an electrostatic printing method, etc., a binder resin composition, and a toner for development of electrostatic images including the binder resin composition.

BACKGROUND OF THE INVENTION

In the field of electrophotography, with the progress of electrophotographic systems, it has been demanded to develop toners for development of electrostatic images adaptable for high image quality and high copying or printing speed.

In patent literature 1, a method for producing a toner for electrophotography including a step of melt-kneading toner raw material containing a binder resin having a softening point of 90 to 120° C., a colorant, and a wax having a melting point of 60 to 100° C., wherein the binder resin contains a linear polyester obtained by condensation polymerization of a carboxylic acid component containing 50 mol % or more of fumaric acid and/or maleic acid and an alcohol component; the content of the wax is 4 parts by weight or less on the basis of 100 parts by weight of the binder resin; the melt-kneading process is carried out by using an open-roll type kneading machine having two rolls having a different temperature from each other; and in one roll having a higher temperature in an upstream side of kneading in the open-roll type kneading machine, the set temperature in the upstream side of kneading is not higher than the softening point of the binder resin, and the set temperature in the downstream side of kneading is not lower than the melting point of the wax, with a ratio of the set temperatures in the upstream side and the downstream side {(set temperature (° C.) in the upstream side)/(set temperature (° C.) in the downstream side)} being 1.0 to 1.5 is written. It is written that according to the production method, a good color image having good low-temperature fusing property even under a low pressurizing force on fusing and having excellent color reproducibility is obtained.

In patent literature 2, a process for making a toner resin including: reacting an organic diol with a cyclic alkylene carbonate in the presence of a first catalyst to form a polyalkoxy diol; reacting the polyalkoxy diol with one or more diacid reagents in the presence of a second catalyst in an esterification reaction; monitoring an acid value of a resulting mixture from the esterification reaction; and subsequently polycondensing the resulting mixture with an unsaturated diacid to form an unsaturated polyester resin is written.

In patent literature 3, a developing agent including toner particles including a binder resin including a first polyester resin synthesized from a first aromatic monomer and a first aliphatic monomer blended with a molar ratio in an alcohol component being satisfied with the relationship of {(aromatic monomer)>(aliphatic monomer)≥0} and with a molar ratio in an acid component being satisfied with the relationship of {(aliphatic monomer)>(aromatic monomer)}, a release agent, and a colorant is written. It is written that according to the developing agent, it is possible to improve fusing offset properties, light gloss, and storage properties at a high temperature.

In patent literature 4, an electrophotographic toner containing a crystalline resin, an amorphous resin, and a release agent, wherein the crystalline resin contains a crystalline composite resin C including a polycondensation-based resin component which is obtained by performing polycondensation of an alcohol component containing an aliphatic diol having a carbon number of 9 or more and 14 or less and a carboxylic acid component containing an aliphatic dicarboxylic acid compound having a carbon number of 9 or more and 14 or less, and a styrene-based resin component; the amorphous resin contains an amorphous composite resin A including a polycondensation-based resin component which is obtained by performing polycondensation of an alcohol component and a carboxylic acid component containing an aromatic dicarboxylic compound, and a styrene-based resin component; an average circularity of the toner is 0.940 or more; and the content of particles having a particle diameter of 3 µm or less in the toner is 5.0 number % or less is written. It is written that according to the toner is excellent in low-temperature fusing property and durability and is suppressed in wrapping of paper at the time of fusing.

CITATION LIST

Patent Literature

Patent Literature 1: JP 2009-192694 A
Patent Literature 2: US 2015/0301467 A
Patent Literature 3: JP 2009-69827 A
Patent Literature 4: JP 2016-114829 A

SUMMARY OF THE INVENTION

An embodiment of the present invention relates to the following [1] to [3].

[1] A method for producing a binder resin composition including the following steps (1) and (2):
  step (1): mixing an aromatic alcohol $A_1$ including an alkylene oxide adduct of bisphenol A and at least one carboxylic acid compound selected from fumaric acid and maleic acid; and
  step (2): further adding an aromatic alcohol $A_2$ including an alkylene oxide adduct of bisphenol A to the mixture obtained in the step (1) and mixing, wherein
  the binder resin composition includes a polyester resin having an acid value of 14 mgKOH/g or more and 30 mgKOH/g or less, and a total content of fumaric acid and maleic acid is 700 ppm by mass or less relative to the binder resin composition; and
  in the steps (1) and (2), a total amount of fumaric acid and maleic acid is 95 parts by mol or more and 105 parts by mol or less on the basis of 100 parts by mol of a total amount of the aromatic alcohol $A_1$ and the aromatic alcohol $A_2$.
[2] A toner for development of electrostatic images, including the binder resin composition obtained by the production method as set forth in [1].
[3] A binder resin composition including a polyester resin that is a polycondensate of an alcohol component including an alkylene oxide adduct of bisphenol A and a carboxylic acid component including at least one carboxylic acid compound selected from fumaric acid and maleic acid, wherein
  the polyester resin has an acid value of 14 mgKOH/g or more and 30 mgKOH/g or less, and in the binder resin composition, a total content of fumaric acid and maleic acid is 700 ppm by mass or less relative to the binder resin composition, and a total amount of fumaric acid and maleic acid is 95 parts by mol or more and 105 parts by mol or less on the basis of 100 parts by mol of a total amount of the alcohol component.

DETAILED DESCRIPTION OF THE INVENTION

In the field of electrophotography, from the viewpoint of promoting much more energy saving, excellent low-temperature fusing property is demanded. In addition, it is demanded to reveal heat-resistant storage stability such that the toner does not coalesce even under a high-temperature condition and high durability such that any streaks which would be possibly caused due to collapse of the toner during printing do not appear on images, and to obtain a higher image density by printing.

In order to enhance the low-temperature fusing property, it may be considered to use a low-molecular weight resin. However, in that case, there was involved such a problem that a part of monomers of the resin remains, whereby the heat-resistant storage stability, durability, and image density are impaired.

An embodiment of the present invention relates to a method for producing a binder resin composition, from which a toner having excellent low-temperature fusing property, heat-resistant storage stability, durability, and image density is obtained, a binder resin composition, and a toner for development of electrostatic images including the binder resin composition.

[Method for Producing Binder Resin Composition]

The method for producing a binder resin composition (hereinafter also referred to as "binder resin composition A") according to the embodiments of the present invention includes the following steps (1) and (2):

step (1): mixing an aromatic alcohol $A_1$ including an alkylene oxide adduct of bisphenol A and at least one carboxylic acid compound selected from fumaric acid and maleic acid (hereinafter also referred to as "carboxylic acid compound B"); and step (2): further adding an aromatic alcohol $A_2$ including an alkylene oxide adduct of bisphenol A to the mixture obtained in the step (1) and mixing.

The binder resin composition A includes a polyester resin (polyester resin A), in which an acid value thereof is 14 mgKOH/g or more and 30 mgKOH/g or less, and a total content of fumaric acid and maleic acid is 700 ppm by mass or less.

Furthermore, in the steps (1) and (2), a total amount of fumaric acid and maleic acid is 95 parts by mol or more and 105 parts by mol or less on the basis of 100 parts by mol of a total amount of the aromatic alcohol $A_1$ and the aromatic alcohol $A_2$.

In accordance with the aforementioned embodiments according to the present invention, there are provided a method for producing a binder resin composition which is excellent in low-temperature fusing property, heat-resistant storage stability, durability, and image density in terms of a resulting toner, a binder resin composition, and a toner for development of electrostatic images including the binder resin composition.

Though the reasons for this are not elucidated yet, the following may be considered.

The polyester resin is focused on as a material exhibiting excellent low-temperature fusing property. While the polyester resin including, as the carboxylic acid component, at least one carboxylic acid compound B selected from fumaric acid and maleic acid is excellent in low-temperature fusing property due to flexibility of aliphatic compounds, when a certain amount or more of the carboxylic acid compound relative to the alcohol component is added, the residual carboxylic acid compound is remained, and therefore, the durability, storage stability, and image density are worsened. According to the production method of patent literature 1, though the residual carboxylic acid compound is decreased, in order to achieve this, it is needed to perform the reaction under a severe reduced pressure condition for a long time. As a result, the softening point of the polyester resin becomes excessively high, so that the low-temperature fusing property is impaired.

In the production method according to an embodiment of the present invention, by separately adding the aromatic alcohol at least two times, even in the case of adding a certain amount or more of the carboxylic acid compound B relative to the alcohol, it has been successfully achieved to decrease the residual carboxylic acid compound B, thereby finding out the matter that the durability, heat-resistant storage stability, and image density can be made compatible with each other without impairing the low-temperature fusing property. By mixing the aromatic alcohol and the carboxylic acid compound B and advancing the polycondensation reaction, the carboxylic acid compound B can be decreased to some extent due to reaction and sublimation of the carboxylic acid B. However, it may be conjectured that if the aromatic alcohol is further added, the residual carboxylic acid compound B reacts with the aromatic alcohol as a monomer in a moment and is oligomerized. According to this, it may be considered that in view of the matter that the residual carboxylic compound B is decreased, the dispersibility of a colorant is improved, too, and as a result, excellent heat-resistant durability, storage stability, and image density are revealed. Furthermore, in view of the matter that the carboxylic acid compound B is included as the carboxylic acid component of the polyester resin, the inherently possessed excellent low-temperature fusing property can also be maintained.

In view of the matter that the acid value is 14 mgKOH/g or more and 30 mgKOH/g or less, it may be considered that the amount of the residual carboxylic acid compound B is decreased while allowing the molecular weight of the polyester resin to fall within an appropriate range, whereby excellent low-temperature fusing property, heat-resistant durability, storage stability, and image density are obtained.

Definitions of various terminologies and so on in the present specification are described below.

Whether the resin is crystalline or non-crystalline is judged in terms of a crystallinity index. The crystallinity index is defined in terms of a ratio of a softening point and a highest temperature of endothermic peak of the resin {(softening point (° C.))/(highest temperature of endothermic peak (° C.))} in the measurement method described in the section of Examples as mentioned later. The crystalline resin is a resin having a crystallinity index of 0.6 or more and less than 1.4, preferably 0.7 or more, and more preferably 0.9 or more, and preferably 1.2 or less. The non-crystalline resin is a resin having a crystallinity index of 1.4 or more, or less than 0.6, preferably 1.5 or more, or 0.5 or less, and more preferably 1.6 or more, or 0.5 or less. The crystallinity index can be suitably adjusted by the kinds and ratios of raw material monomers as well as production conditions, such as reaction temperature, reaction time, and cooling rate. The highest temperature of endothermic peak indicates a temperature of the highest peak among endothermic peaks observed. The crystallinity index can be calculated from values obtained by the measurement method of the softening point and the highest temperature of endothermic peak of the resin described in the section of Examples.

The "binder resin" as referred to in the specification means a resin component which is included in the toner, including the binder resin composition A.

<Step (1)>

In the step (1), heat-resistant storage stability, durability, and image density of the toner, the aromatic alcohol $A_1$ including an alkylene oxide adduct of bisphenol A and at least one carboxylic acid compound selected from fumaric acid and maleic acid are mixed, from the viewpoints of low-temperature fusing property.

The step (1) is preferably a step of mixing the aforementioned aromatic alcohol $A_1$ and the aforementioned carboxylic acid compound at a temperature $T_1$ of 200° C. or higher and lower than 230° C. for 2 hours or more and less than 5 hours.

The aromatic alcohol $A_1$ preferably includes an alkylene oxide adduct of bisphenol, and more preferably includes an alkylene oxide adduct of bisphenol A represented by the formula (I):

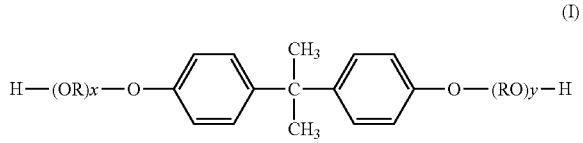

wherein in the formula, OR and RO are each an oxyalkylene group; R is at least one selected from an ethylene group and a propylene group; x and y are each an average addition molar number of the alkylene oxide and a positive number; and a value of the sum of x and y is 1 or more, and preferably 1.5 or more, and it is 16 or less, preferably 8 or less, and more preferably 4 or less.

The bisphenol A is 2,2-bis(4-hydroxyphenyl)propane.

Examples of the alkylene oxide adduct of bisphenol A represented by the formula (I) include a propylene oxide adduct of bisphenol A and an ethylene oxide adduct of bisphenol A. These may be used either alone or in combination of two or more thereof. Among these, a propylene oxide adduct of bisphenol A is preferred from the viewpoint of more improving low-temperature fusing property and heat-resistant storage stability.

The content of the alkylene oxide adduct of bisphenol A in the aromatic alcohol $A_1$ is preferably 40 mol % or more, more preferably 60 mol % or more, still more preferably 70 mol % or more, yet still more preferably 90 mol % or more, and even yet still more preferably 95 mol % or more, and it is 100 mol % or less, and even still more preferably 100 mol %.

In the step (1), other alcohol component may be included.

Examples of the other alcohol component include aliphatic polyols.

Examples of the aliphatic polyol include aliphatic diols having a carbon number of 2 or more and 20 or less; and trihydric or higher hydric aliphatic alcohols, such as glycerin.

Examples of the aliphatic diol include ethylene glycol, 1,2-propanediol, 1,3-propanediol, 1,4-butanediol, 1,5-pentanediol, 1,6-hexanediol, 1,4-butenediol, 1,3-butanediol, neopentyl glycol, 1,10-decanediol, and 1,12-dodecanediol.

In the step (1), the amount of the aromatic alcohol $A_1$ is preferably 60 parts by mol or more, more preferably 65 parts by mol or more, still more preferably 70 parts by mol or more, yet still more preferably 75 parts by mol or more, even yet still more preferably 80 parts by mol or more, and even still more preferably 85 parts by mol or more, from the viewpoint of more improving heat-resistant storage stability and durability, and is preferably 99 parts by mol or less, more preferably 95 parts by mol or less, and still more preferably 93 parts by mol or less from the viewpoint of more improving low-temperature fusing property and image density, on the basis of 100 parts by mol of a sum total of the aromatic alcohol $A_1$ and the aromatic alcohol $A_2$.

In the step (1), preferably, the carboxylic acid compound B includes at least fumaric acid.

The amount of fumaric acid in the carboxylic acid compound B is preferably 60 mol % or more, more preferably 70 mol % or more, still more preferably 80 mol % or more, yet still more preferably 90 mol % or more, even yet still more preferably 95 mol % or more, and even still more preferably 98 mol % or more, from the viewpoint of more improving heat-resistant storage stability, durability, and image density, and is 100 mol % or less, and even still more further preferably 100 mol %, from the viewpoint of more improving low-temperature fusing property.

As the carboxylic acid component which is used in the step (1), other carboxylic acid component than the carboxylic acid B may be contained.

Examples of the other carboxylic acid include dicarboxylic acids other than the carboxylic acid compound B; and trivalent or higher valent carboxylic acids.

Examples of the dicarboxylic acid include aromatic dicarboxylic acids, straight-chain or branched aliphatic dicarboxylic acids, and alicyclic dicarboxylic acids. Among these, at least one selected from aromatic dicarboxylic acids and straight-chain or branched aliphatic dicarboxylic acids is preferred.

Examples of the aromatic dicarboxylic acid include phthalic acid, isophthalic acid, and terephthalic acid.

Examples of the straight-chain or branched aliphatic dicarboxylic acid include oxalic acid, malonic acid, citraconic acid, itaconic acid, glutaconic acid, succinic acid, adipic acid, sebacic acid, dodecanedioic acid, azelaic acid, and a succinic acid substituted with an alkyl group having a carbon number of 1 or more and 20 or less or an alkenyl group having a carbon number of 2 or more and 20 or less. Examples of the succinic acid substituted with an alkyl group having a carbon number of 1 or more and 20 or less or an alkenyl group having a carbon number of 2 or more and 20 or less include dodecylsuccinic acid, dodecenylsuccinic acid, and octenylsuccinic acid.

The trivalent or higher valent carboxylic acid is preferably a trivalent carboxylic acid, and examples thereof include trimellitic acid or an anhydride thereof.

These carboxylic acid components may be used either alone or in combination of two or more thereof.

A total amount of the carboxylic acid compound B in the carboxylic acid component is preferably 60 mol % or more, more preferably 70 mol % or more, still more preferably 80 mol % or more, yet still more preferably 90 mol % or more, even yet still more preferably 95 mol % or more, and even still more preferably 98 mol % or more, from the viewpoint of more improving heat-resistant storage stability, durability, and image density, and is 100 mol % or less, and even still more further preferably 100 mol % from the viewpoint of more improving low-temperature fusing property.

In the step (1), a molar ratio of the carboxylic acid B to the aromatic alcohol $A_1$ [(carboxylic acid compound B)/ (aromatic alcohol $A_1$)] is preferably 0.95 or more, more preferably 1 or more, and still more preferably 1.1 or more, and is preferably 1.6 or less, more preferably 1.5 or less, still more preferably 1.4 or less, yet still more preferably 1.3 or less, and even still more preferably 1.2 or less, from the viewpoint of more improving low-temperature fusing property, heat-resistant storage stability, durability, and image density.

In the step (1), the temperature $T_1$ is preferably 200° C. or higher, more preferably 205° C. or higher, and still more preferably 210° C. or higher, from the viewpoint of more improving low-temperature fusing property, heat-resistant storage stability, durability, and image density, and is preferably lower than 230° C., more preferably 225° C. or lower, still more preferably 220° C. or lower, and yet still more preferably 215° C. or lower, from the viewpoint of more improving low-temperature fusing property.

When the aromatic alcohol $A_1$ and the carboxylic acid compound B are mixed at such a temperature $T_1$, the carboxylic acid compound B is consumed, an effect to be brought by the addition of the aromatic alcohol $A_2$ in the step (2) as mentioned later can be remarkably enhanced, and the low-temperature fusing property, heat-resistant storage stability, durability, and image density are more improved.

A holding time at the temperature $T_1$ is preferably 2 hours or more, and more preferably 2.5 hours or more, from the viewpoint of more improving low-temperature fusing property, heat-resistant storage stability, durability, and image density, and is preferably less than 5 hours, more preferably 4 hours or less, and still more preferably 3.5 hours or less, from the viewpoint of more improving low-temperature fusing property.

The holding time at the temperature $T_1$ means a time for which the temperature falls within the prescribed range of the temperature $T_1$.

Preferably, the step (1) is performed by mixing in the presence of an esterification catalyst. In the step (1), a promotor may further be used.

Examples of the esterification catalyst include tin compounds, such as monobutyltin oxide, dibutyltin oxide, and tin(II) 2-ethylhexanoate; and titanium compounds, such as titanium diisopropylate bistriethanol aminate. Among these, monobutyltin oxide is preferred.

The amount of the esterification catalyst is preferably 0.01 parts by mass or more, and more preferably 0.1 parts by mass or more, and it is preferably 1 part by mass or less, and more preferably 0.6 parts by mass or less, on the basis of 100 parts by mass of the total amount of the alcohol component including the aromatic alcohol $A_1$ and the aromatic alcohol $A_2$ and the carboxylic acid component including the carboxylic acid compound B.

Examples of the esterification promotor which may be used together with the esterification catalyst include pyrogallol, gallic acid, gallic acid esters, benzophenone derivatives, such as 2,3,4-trihydroxybenzophenone and 2,2',3,4-tetrahydroxybenzophenone, and catechin derivatives, such as epigallocatechin and epigallocatechin gallate.

The amount of the esterification promotor is preferably 0.001 parts by mass or more, and more preferably 0.01 parts by mass or more, and it is preferably 0.5 parts by mass or less, and more preferably 0.1 parts by mass or less, on the basis of 100 parts by mass of the total amount of the alcohol component including the aromatic alcohol $A_1$ and the aromatic alcohol $A_2$ and the carboxylic acid component including the carboxylic acid compound B.

In the step (1), a polymerization inhibitor is preferably used.

Examples of the polymerization inhibitor include hydroquinone compounds, such as hydroquinone and methylhydroquinone, and catechol compounds, such as catechol and 2-t-butylcatechol.

The amount of the polymerization inhibitor is preferably 0.001 parts by mass or more, and more preferably 0.01 parts by mass or more, and it is preferably 0.5 parts by mass or less, and more preferably 0.1 parts by mass or less, on the basis of 100 parts by mass of the total amount of the alcohol component including the aromatic alcohol $A_1$ and the aromatic alcohol $A_2$ and the carboxylic acid component including the carboxylic acid compound B.

The step (1) may be performed in an inert gas atmosphere.

<Step (2)>

In the step (2), an aromatic alcohol $A_2$ including an alkylene oxide adduct of bisphenol A is added to the mixture obtained in the step (1) and mixed.

Preferably, the step (2) is a step of further adding an aromatic alcohol $A_2$ including an alkylene oxide adduct of bisphenol A to the mixture obtained in the step (1) at a temperature $T_2$ of 180° C. or higher and lower than 225° C. and mixing until a softening point of the resin in the system falls within a range of 90° C. or higher and 105° C. or lower.

Preferable examples of the aromatic alcohol $A_2$ are the same as those as exemplified for the aromatic alcohol $A_1$.

The content of the alkylene oxide adduct of bisphenol A in the aromatic alcohol $A_2$ is preferably 40 mol % or more, more preferably 60 mol % or more, still more preferably 70 mol % or more, yet still more preferably 90 mol % or more, and even yet still more preferably 95 mol % or more, and it is 100 mol % or less, and even still more preferably 100 mol %.

In the step (2), the addition amount of the aromatic alcohol $A_2$ is preferably 1 part by mol or more, more preferably 2 parts by mol or more, still more preferably 3 parts by mol or more, and yet still more preferably 5 parts by mol or more, from the viewpoint of more improving low-temperature fusing property, durability, and image density, and is preferably 40 parts by mol or less, more preferably 35 parts by mol or less, still more preferably 30 parts by mol or less, yet still more preferably 20 parts by mol or less, and even still more preferably 15 parts by mol or less, from the viewpoint of more improving low-temperature fusing property, durability, and image density, on the basis of 100 parts by mol of a sum total of the aromatic alcohol $A_1$ and the aromatic alcohol $A_2$.

A molar ratio ($A_1/A_2$) of the amount of the aromatic alcohol $A_1$ in the step (1) and the amount of the aromatic alcohol $A_2$ in the step (2) is preferably 65/35 or more, more preferably 70/30 or more, still more preferably 80/20 or more, and yet still more preferably 85/15 or more, and is preferably 99/1 or less, more preferably 98/2 or less, and still more preferably 95/5 or less, from the viewpoint of more improving low-temperature fusing property, heat-resistant storage stability, durability, and image density.

A total amount of fumaric acid and maleic acid is 95 parts by mol or more, preferably 97 parts by mol or more, more preferably 99 parts by mol or more, still more preferably 100 parts by mol or more, and yet still more preferably 101 parts by mol or more, and it is 105 parts by mol or less, more preferably 104 parts by mol or less, and still more preferably 103 parts by mol or less, on the basis of 100 parts by mol of a total amount of the amount of the aromatic alcohol $A_1$ and the amount of the aromatic alcohol $A_2$, from the viewpoint of obtaining excellent heat-resistant storage stability, durability, and image density.

In the step (2), the temperature $T_2$ is preferably 180° C. or higher, more preferably 185° C. or higher, and still more preferably 188° C. or higher, and it is preferably lower than 225° C., more preferably 210° C. or lower, still more preferably 200° C. or lower, and yet still more preferably 195° C. or lower, from the viewpoint of more improving low-temperature fusing property, heat-resistant storage stability, durability, and image density.

A difference $[T_1-T_2]$ between the temperature $T_1$ in the step (1) and the temperature $T_2$ in the step (2) is preferably 0° C. or more, more preferably 5° C. or more, still more preferably 10° C. or more, and yet still more preferably 20° C. or more, and is preferably 45° C. or less, more preferably 40° C. or less, still more preferably 35° C. or less, yet still more preferably 30° C. or less, and even yet still more preferably 25° C. or less, from the viewpoint of more improving low-temperature fusing property, heat-resistant storage stability, and durability.

A holding time at the temperature $T_2$ is preferably 1 hour or more, and more preferably 1.5 hours or more, from the viewpoint of more improving heat-resistant storage stability and durability, and, is preferably 6 hours or less, more preferably 4 hours or less, and still more preferably 3 hours or less, from the viewpoint of more improving low-temperature fusing property.

The holding time at the temperature $T_2$ means a time for which after addition of the carboxylic acid in the step (2), the temperature falls within the range of the temperature $T_2$ as prescribed above.

The mixing at the temperature $T_2$ is preferably performed until a softening point of the resin in the system falls within a range of 90° C. or higher and 105° C. or lower, from the viewpoint of more improving low-temperature fusing property, heat-resistant storage stability, durability, and image density.

The softening point of the resin in the system at the time of completion of mixing in the step (2) is preferably 95° C. or higher, more preferably 98° C. or higher, and still more preferably 100° C. or higher, from the viewpoint of more improving heat-resistant storage stability and durability, and is preferably 105° C. or lower, more preferably 104° C. or lower, still more preferably 103° C. or lower, and yet still more preferably 102° C. or lower, from the viewpoint of more improving low-temperature fusing property.

Similar to the step (1), preferably, the step (2) is performed by mixing in the presence of an esterification catalyst. In the step (2), the mixing may be performed in the presence of a promotor. In addition, in the step (2), the mixing may also be performed in the presence of a polymerization inhibitor.

The esterification catalyst, the promotor, and the polymerization inhibitor are the same as those in the step (1).

The step (2) may be performed in an inert gas atmosphere.

In the step (2), the mixing is preferably performed under a reduced pressure condition. The pressure in the step (2) is preferably 2 kPa or more, and more preferably 3 kPa or more, and it is preferably 20 kPa or less, more preferably 15 kPa or less, and still more preferably 12 kPa or less.

[Binder Resin Composition A]

The binder resin composition A (hereinafter also referred to simply as "polyester resin A") which is obtained by the aforementioned production method includes a polyester resin A having an acid value of 14 mgKOH/g or more and 30 mgKOH/g or less, from the viewpoints of low-temperature fusing property, heat-resistant storage stability, durability, and image density of the toner.

As for the binder resin composition A, in addition to the aforementioned properties, a total content of fumaric acid and maleic acid is 700 ppm by mass or less relative to the binder resin composition A, from the viewpoints of low-temperature fusing property, heat-resistant storage stability, durability, and image density of the toner.

The total content of fumaric acid and maleic acid in the binder resin composition A is 700 ppm by mass or less, preferably 650 ppm by mass or less, more preferably 600 ppm by mass or less, still more preferably 550 ppm by mass or less, yet still more preferably 500 ppm by mass or less, and even yet still more preferably 450 ppm by mass or less, and is preferably 10 ppm by mass or more, more preferably 50 ppm by mass or more, still more preferably 100 ppm by mass or more, yet still more preferably 200 ppm by mass or more, and even still more preferably 300 ppm by mass or more, from the viewpoint of more improving heat-resistant storage stability, durability, and image density.

A measurement method of the total content of fumaric acid and maleic acid follows the method described in the section of Examples.

The total content of fumaric acid and maleic acid in the binder resin composition A can be, for example, obtained by the method including the aforementioned steps (1) and (2) as in the production method as mentioned above.

The polyester resin A is, for example, a polycondensate of an alcohol component including an alkylene oxide adduct of bisphenol A and a carboxylic acid component including at least carboxylic acid compound selected from fumaric acid and maleic acid.

Preferably, the polyester resin A is non-crystalline.

The acid value of the polyester resin A is 14 mgKOH/g or more, preferably 16 mgKOH/g or more, more preferably 17 mgKOH/g or more, and still more preferably 18 mgKOH/g or more, from the viewpoint of more improving low-temperature fusing property, and is 30 mgKOH/g or less, preferably 28 mgKOH/g or less, more preferably 25 mgKOH/g or less, and still more preferably 22 mgKOH/g or less, from the viewpoint of more improving heat-resistant storage stability, durability, and image density.

A softening point of the polyester resin A is preferably 90° C. or higher, more preferably 95° C. or higher, still more preferably 98° C. or higher, and yet still more preferably 100° C. or higher, from the viewpoint of more improving heat-resistant storage stability, durability, and image density, and is preferably 105° C. or lower, more preferably 104° C. or lower, still more preferably 103° C. or lower, and yet still more preferably 102° C. or lower, from the viewpoint of more improving low-temperature fusing property.

A glass transition temperature of the polyester resin A is preferably 45° C. or higher, more preferably 50° C. or higher, and still more preferably 55° C. or higher, from the viewpoint of more improving heat-resistant storage stability, durability, and image density, and is preferably 80° C. or lower, more preferably 75° C. or lower, still more preferably 70° C. or lower, yet still more preferably 65° C. or lower, and even yet still more preferably 60° C. or lower, from the viewpoint of more improving low-temperature fusing property.

A weight average molecular weight Mw of the polyester resin A is preferably 25,000 or less, more preferably 20,000 or less, still more preferably 18,000 or less, and yet still more preferably 17,000 or less, from the viewpoint of more improving low-temperature fusing property, and is preferably 5,000 or more, more preferably 10,000 or more, still more preferably 13,000 or more, and yet still more preferably 15,000 or more, from the viewpoint of more improving heat-resistant storage stability, durability, and image density.

A number average molecular weight Mn of the polyester resin A is preferably 1,000 or more, more preferably 2,000 or more, still more preferably 3,000 or more, yet still more preferably 3,500 or more, and even yet still more preferably 3,600 or more, from the viewpoint of more improving heat-resistant storage stability, durability, and image density, and is preferably 7,000 or less, more preferably 5,000 or less, still more preferably 4,500 or less, yet still more preferably 4,000 or less, and even yet still more preferably 3,800 or less, from the viewpoint of more improving low-temperature fusing property.

A polydispersity (Mw/Mn) of the polyester resin A is preferably 1.5 or more, more preferably 2.5 or more, still more preferably 3.5 or more, and yet still more preferably 4.0 or more, and from the viewpoint of more improving low-temperature fusing property, the polydispersity (Mw/Mn) of the polyester resin A is preferably 20 or less, more preferably 15 or less, still more preferably 8 or less, yet still more preferably 6 or less, even yet still more preferably 5.5 or less, even still more preferably 5 or less, and even still more further preferably 4.8 or more.

Measurement methods of the softening point, glass transition temperature, acid value, weight average molecular weight, number average molecular weight, and polydispersity follow the methods described in the section of Examples.

The content of the polyester resin A is preferably 80% by mass or more, more preferably 90% by mass or more, still more preferably 95% by mass or more, yet still more preferably 98% by mass or more, and even yet still more preferably substantially 100% by mass.

[Toner for Development of Electrostatic Images]

The obtained binder resin composition A is used for a toner for development of electrostatic images (hereinafter also referred to simply as "toner"). The toner according to the embodiments of the present invention includes the binder resin composition A.

More specifically, the toner according to the embodiments of the present invention may, for example, contain toner particles including the binder resin composition A and an external additive.

The content of the binder resin composition A in the binder resin of the toner is preferably 20% by mass or more, more preferably 30% by mass or more, still more preferably 40% by mass or more, yet still more preferably 60% by mass or more, even yet still more preferably 80% by mass or more, even still more preferably 90% by mass or more, and even still more further preferably 95% or more, and it is preferably 100% by mass or less.

<Binder Resin H>

The toner may further include, in addition to the aforementioned binder resin composition A, a binder resin H having a softening point higher by at least 20° C.

The softening point of the binder resin H is preferably 150° C. or lower, more preferably 140° C. or lower, and still more preferably 135° C. or lower, and it is preferably 110° C. or higher, more preferably 120° C. or higher, and still more preferably 130° C. or higher, from the viewpoint of more improving low-temperature fusing property.

A difference in the softening point between the binder resin H and the binder resin composition A is preferably 10° C. or higher, more preferably 20° C. or higher, still more preferably 25° C. or higher, and yet still more preferably 30° C. or higher, and it is preferably 60° C. or lower, more preferably 50° C. or lower, and still more preferably 40° C. or lower.

In the case of including the binder resin H, a mass ratio of the binder resin composition A and the binder resin H {(binder resin composition A)/(binder resin H)} is preferably 10/90 or more, more preferably 20/80 or more, and still more preferably 25/75 or more, and it is preferably 80/20 or less, more preferably 60/40 or less, and still more preferably 50/50 or less.

A total content of the binder resin composition A and the binder resin H in the binder resin of the toner is preferably 80% by mass or more, more preferably 90% by mass or more, and still more preferably 95% by mass or more, and it is preferably 100% by mass or less.

The toner may include additives, such as a charge control agent, a colorant, a release agent, a magnetic powder, a fluidity improver, a conductive modifier, a reinforcing agent, such as a fibrous material, an antioxidant, an age resistor, and a cleanability improver. Among these, a charge control agent, a colorant, and a release agent are preferred. Preferably, such an additive is included in the toner particles.

<Charge Control Agent>

As the charge control agent, for example, all of a positively chargeable charge control agent and a negatively chargeable charge control agent may be contained.

Examples of the positively chargeable charge control agent include nigrosine dyes, for example, "NIGROSINE BASE EX", "OIL BLACK BS", "OIL BLACK SO", "BONTRON N-01", "BONTRON N-04", "BONTRON N-07", "BONTRON N-09", and "BONTRON N-11" (all of which are manufactured by Orient Chemical Industries Co., Ltd.), etc.; triphenylmethane-based dyes containing a tertiary amine in a side chain thereof, and quaternary ammonium salt compounds, for example, "BONTRON P-51" (manufactured by Orient Chemical Industries Co., Ltd.), cetyltrimethylammonium bromide, "COPY CHARGE PX VP435" (manufactured by Clariant), etc.; polyamine resins, for example, "AFP-B" (manufactured by Orient Chemical Industries Co., Ltd.), etc.; imidazole derivatives, for example, "PLZ-2001" and "PLZ-8001" (all of which are manufactured by Shikoku Chemicals Corporation), etc.; and styrene-acrylic resins, for example, "FCA-701PT" (manufactured by Fujikura Chemical Co., Ltd.).

Examples of the negatively chargeable charge control agent include metal-containing azo dyes, for example, "VALIFAST BLACK 3804", "BONTRON S-31", "BONTRON S-32", "BONTRON S-34", and "BONTRON S-36" (manufactured by Orient Chemical Industries Co., Ltd.), "AIZEN SPILON BLACK TRH" and "T-77" (manufactured by Hodogaya Chemical Co., Ltd.), etc.; metal compounds of benzilic acid compounds, for example, "LR-147" and "LR-297" (all of which are manufactured by Japan Carlit Co., Ltd.), etc.; metal compounds of salicylic acid compounds, for example, "BONTRON E-81", "BONTRON E-84", "BONTRON E-88", and "BONTRON E-304" (all of which are manufactured by Orient Chemical Industries Co., Ltd.), "TN-105" (manufactured by Hodogaya Chemical Co., Ltd.), etc.; copper phthalocyanine dyes; quaternary ammonium salts, for example, "COPY CHARGE NX VP434" (manufactured by Clariant), nitroimidazole derivatives, etc.; and organic metal compounds.

Among the charge control agents, negatively chargeable charge control agents are preferred, and metal compounds of benzilic acid compounds or metal compounds of salicylic acid compounds are more preferred.

The content of the charge control agent is preferably 0.01 parts by mass or more, and more preferably 0.2 parts by mass or more, and it is preferably 10 parts by mass or less, more preferably 5 parts by mass or less, still more preferably 3 parts by mass or less, and yet still more preferably 2 parts by mass or less, on the basis of 100 parts by mass of the binder resin in the toner.

<Colorant>

As the colorant, all of dyes, pigments, and so on, which are used as a colorant for toners, can be used. For example, carbon black, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, Carmine 6B, Disazo Yellow, and so on can be used. The toner may be any of black toners and color toners.

The content of the colorant is preferably 1 part by mass or more, and more preferably 2 parts by mass or more, and it is preferably 40 parts by mass or less, more preferably 20 parts by mass or less, and still more preferably 10 parts by mass or less, on the basis of 100 parts by mass of the binder resin in the toner.

<Release Agent>

Examples of the release agent include hydrocarbon-based waxes, such as a polypropylene wax, a polyethylene wax, a polypropylene-polyethylene copolymer wax, a microcrystalline wax, a paraffin wax, a Fischer-Tropsch wax, and a Sazole wax, and oxides thereof; ester-based waxes, such as a carnauba wax, a montan wax, and deacidified waxes thereof; and a fatty acid ester wax; aliphatic acid amides, fatty acids, higher alcohols, and fatty acid metal salts. These may be used either alone or in combination of two or more thereof.

A melting point of the release agent is preferably 60° C. or higher, and more preferably 70° C. or higher, and is preferably 160° C. or lower, and more preferably 145° C. or lower, from the viewpoint of low-temperature fusing property.

The content of the release agent is preferably 0.5 parts by mass or more, more preferably 1.0 part by mass or more, and still more preferably 1.5 parts by mass or more, and is preferably 10 parts by mass or less, more preferably 8 parts by mass or less, and still more preferably 7 parts by mass or less, from the viewpoint of dispersibility in the binder resin, on the basis of 100 parts by mass of the binder resin in the toner.

A volume median particle diameter ($D_{50}$) of the toner particles is preferably 2 μm or more, more preferably 3 μm or more, and still more preferably 4 μm or more, and it is preferably 20 μm or less, more preferably 15 μm or less, and still more preferably 10 μm or less.

Though the toner particles may be used directly as a toner, those obtained by subjecting the toner particle surfaces to an addition treatment with a fluidizing agent, etc. as the external additive are preferably used.

Examples of the external additive include inorganic material fine particles of hydrophobic silica, titanium oxide, alumina, cerium oxide, carbon black, etc.; and polymer fine particles of a polycarbonate, polymethyl methacrylate, a silicone resin, etc. Among these, hydrophobic silica is preferred.

In the case of containing the external additive, the addition amount of the external additive is preferably 1 part by mass or more, more preferably 2 parts by mass or more, and still more preferably 3 parts by mass or more, and it is preferably 5 parts by mass or less, more preferably 4.5 parts by mass or less, and still more preferably 4 parts by mass or less, on the basis of 100 parts by mass of the toner particles.

The toner is used for development of latent images to be formed in an electrophotographic method, an electrostatic recording method, an electrostatic printing method, etc. The toner can be used as one-component developer, or can be mixed with a carrier and used as a two-component developer.

[Production Method of Toner]

Though the toner may be a toner obtained by any of known methods, such as a melt-kneading method, an emulsion phase inversion method, a polymerization method, and an emulsion coagulation method, from the viewpoints of productivity and dispersibility of the colorant, a pulverized toner by the melt-kneading method is preferred.

In the case of a pulverized toner, for example, a method for producing a toner includes:

step (a): melt-kneading toner raw materials including the binder resin composition A; and step (b): pulverizing and classifying the melt-kneaded mixture obtained in the step (a) to obtain toner particles.

In the step (a), the toner raw materials may include other additives, such as the binder resin H, the release agent, the charge control agent, and the colorant. Preferably, these toner raw materials are previously mixed with a mixer, such as a Henschel mixer and a ball mill, and then fed into a kneader.

A temperature of the melt-kneading is preferably 80° C. or higher, more preferably 100° C. or higher, and still more preferably 110° C. or higher, and it is preferably 160° C. or lower, and more preferably 150° C. or lower.

The melt-kneading in the step (a) can be performed with a known kneader, such as a closed kneader, a single-screw extruder, a twin-screw extruder, and an open-roll type kneader. From the viewpoint of melt-mixing crystals, a twin-screw extruder which can be set under a high-temperature condition is preferred.

The molten mixture obtained in the step (a) is cooled to an extent such that it is possible to perform the pulverization, and then subjected to the subsequent step (2).

The pulverization of the step (b) may be performed in divided multi-stages. For example, the resin kneaded material obtained by curing the molten mixture may be coarsely pulverized to a size of 1 mm or more and 5 mm or less and then further finely pulverized to a desired particle diameter.

Examples of a pulverizer which is suitably used for coarse pulverization include a hammer mill, an atomizer, and Rotoplex. Examples of a pulverizer which is suitably used for fine pulverization include a fluidized bed jet mill, a collision plate-type jet mill, and a rotary mechanical mill. From the viewpoint of pulverization efficiency, it is preferred to use a fluidized bed jet mill or a collision plate-type jet mill, and it is more preferred to use a collision plate-type jet mill.

Examples of a classifier which is used for classification include a rotor type classifier, an air classifier, an inertial classifier, and a sieve classifier. The pulverized product which is insufficiently pulverized and removed during the classifying step may be subjected to the pulverization step again, and the pulverization step and the classification step may be repeated, as required.

As for the obtained toner particles, the toner particle surfaces may be subjected to an addition treatment with a fluidizing agent, etc. as the external additive.

EXAMPLES

The present invention is hereunder specifically described by reference to Examples, but it should be construed that the present invention is by no means limited by these Examples.

Properties of resins and so on were measured by the following methods.
[Measurement Methods]
[Acid Value of Resin]

The acid value of the resin is measured on the basis of the method of JIS K0070:1992. However, only the measurement solvent is changed from a mixed solvent of ethanol and ether as prescribed in JIS K0070:1992 to a mixed solvent of acetone and toluene (acetone/toluene=1/1 (volume ratio)).
[Softening Point and Glass Transition Temperature of Resin]
(1) Softening Point Using a flow tester "CFT-500D" (manufactured by Shimadzu Corporation), 1 g of a sample is extruded through a nozzle having a diameter of 1 mm and a length of 1 mm by applying a load of 1.96 MPa from a plunger while heating the sample at a temperature rise rate of 6° C./min. A downward movement of the plunger of the flow tester is plotted relative to the temperature, and the temperature at which a half amount of the sample flows out is defined as the softening point.
(2) Highest Temperature of Endothermic Peak Using a differential scanning calorimeter "DSC 2 STAR" (manufactured by Mettler-Toledo), a sample which has been cooled from room temperature (20° C.) to 0° C. at a temperature drop rate of 10° C./min is kept as it is for one minute. Thereafter, the measurement is performed while raising the temperature to 180° C. at a temperature rise rate of 10° C./min. Among the endothermic peaks observed, a temperature of the peak of the highest temperature side is defined as the highest temperature of endothermic peak.
(3) Glass Transition Temperature Using a differential scanning calorimeter "DSC 2 STAR" (manufactured by Mettler-Toledo), 0.01 to 0.02 g of a sample is weighed in an aluminum pan, subjected to temperature rise to 200° C., and then cooled from that temperature to 0° C. at a temperature drop rate of 10° C./min. Subsequently, the measurement is performed while raising the temperature to 150° C. at a temperature rise rate of 10° C./min. A temperature of an intersection of the extension of the baseline of not higher than the highest temperature of endothermic peak and the tangential line showing the maximum inclination between the kick-off of the peak and the top of the peak is defined as the glass transition temperature.
[Molecular Weight Distribution Measured by Gel Permeation Chromatography: Number Average Molecular Weight, Weight Average Molecular Weight, Polydispersity of Resin]

The molecular weight distribution is measured by the gel permeation chromatography (GPC) according to the following method. From the results, the number average molecular weight Mn, the weight average molecular weight Mw, the polydispersity Mw/Mn of a resin are determined.
(1) Preparation of Sample Solution A resin is dissolved in tetrahydrofuran such that its concentration is 0.5 g/100 mL. Subsequently, this solution is filtered with a fluorine resin filter "Syringe Filter" (manufactured by American Chromatography Supplies LLC) having a pore size of 0.45 μm, to remove insoluble components, thereby providing the sample solution.
(2) Measurement of Molecular Weight Using the following apparatus, tetrahydrofuran as an eluent is allowed to flow through a column at a flow rate of 1 mL per minute, and the column is stabilized in a thermostat at 40° C. 100 μL of the sample solution is injected thereinto, and the measurement is performed. The molecular weight of the sample is calculated on the basis of a previously prepared calibration curve. As the calibration curve at this time, a calibration curve prepared from several kinds of monodisperse polystyrenes having an already-known molecular weight (those manufactured by Tosoh Corporation, molecular weight: $2.63 \times 10^3$, $2.06 \times 10^4$, $1.02 \times 10^5$; and those manufactured by GL Sciences Inc., molecular weight: $2.10 \times 10^3$, $7.00 \times 10^3$, and $5.04 \times 10^4$) as standard samples is used.

Measurement apparatus: "HLC-8320 GPC EcoSEC" (manufactured by Tosoh Corporation)

Analyzing column: "TSKgel Guard Super HZ-L"+"TSKgel Super HZM-H"+"TSKgel Super HZ3000" (all of which are manufactured by TOSOH Biosciences LLC)
[Volume Median Particle Diameter ($D_{50}$) of Toner Particles and Toner]

The volume median particle diameter ($D_{50}$) of each of the toner particles and the toner was measured by the following method.

Measuring machine: "Coulter Multisizer II" (manufactured by Beckman Coulter, Inc.)

Aperture diameter: 50 μm

Analyzing software: "Coulter Multisizer AccuComp Ver. 1.19" (manufactured by Beckman Coulter, Inc.)

Electrolytic solution: "Isotone II" (manufactured by Beckman Coulter, Inc.)

Dispersion: 5% by mass electrolytic solution of "Emulgen 109P" (manufactured by Kao Corporation, polyoxyethylene lauryl ether, HLB: 13.6)

Dispersing condition: 10 mg of the sample to be measured is added to 5 mL of the dispersion and dispersed with an ultrasonic disperser for one minute. Thereafter, 25 mL of the electrolytic solution is added, and the obtained mixture is further dispersed with an ultrasonic disperser for one minute.

Measurement condition: In a beaker, 100 mL of the electrolytic solution and the dispersion are added, the particle diameters of 30,000 particles are measured in a concentration at which the particle diameters of the 30,000 particles can be measured for 20 seconds, and the volume median particle diameter ($D_{50}$) is determined from a particle size distribution thereof.
[Total Content of Fumaric Acid and Maleic Acid in Binder Resin Composition]
(1) Preparation of Sample Solution (1-1) 0.3 g of a sample (resin) is weighed, to which is then added tetrahydrofuran, thereby preparing 3 mL of a solution.

(1-2) The prepared solution is transferred into a test tube with cap, to which is then added 3 mL of ion exchange water.

(1-3) The mixed solution in the test tube is thoroughly stirred with a touch mixer and subjected to phase separation with a centrifuge, and a lower layer (aqueous phase) is aliquoted as the sample solution.
(2) Preparation of Calibration Curve Fumaric acid and maleic acid of 0.1 to 1.5 g are each weighed at intervals of 0.1 to prepare 30 samples in total, and the samples are each precisely made to 100 mL with ion exchange water. Using these high-performance liquid chromatography measurement results, the calibration curve was prepared using 1 to 15 mg/L calibration curve solutions. The calibration curve was prepared by plotting the relation between the peak surface derived from fumaric acid and maleic acid and the sample concentration.
(3) Preparation of Eluent A solution obtained by dissolving 1 mL of a 0.1% by mass phosphoric acid aqueous solution in 1 L of ion exchange water was used as the eluent.

(4) High-Performance Liquid Chromatography Measurement

Apparatus: Manufactured by Variant Inc.
Autosampler: Injection amount: 20 μL, analysis time: 15 minutes
Pump: Flow rate: 1.0 m/min
Column oven: 40° C.
Column: Tosoh Bioscience-P/N-17202-4.6 mm ID×25 cm×5 μm
Detector: UVD 210 nm (5) Calculation of Total Content of Fumaric Acid and Maleic Acid The peak area in the chart obtained through the measurement is compared with the calibration curve, the concentration of fumaric acid and maleic in the sample solution is calculated, and the residual amount of fumaric acid and maleic acid contained in the resin is determined as a mass fraction (ppm by mass) according to the following formula.

Residual amount (ppm by mass) of fumaric acid and maleic acid=[(Concentration (mg/L) of fumaric acid and maleic acid in the sample solution)× 0.003 (L)]/300 mg×10$^6$

[Production of Binder Resin Composition]

Examples A1 to A11 and Comparative Example A52 [Binder Resin Compositions A-1 to A-11 and A-52]

An alcohol component $A_1$, a carboxylic acid component, an esterification catalyst, and a polymerization inhibitor shown in Table 1 were placed in a four-necked flask having 10 L-capacity equipped with a dehydration tube equipped with a nitrogen inlet tube, a stirrer, and a thermocouple. After holding the temperature at 180° C. for 1 hour in a nitrogen atmosphere at atmospheric pressure, the temperature was raised to a temperature $T_1$ shown in the table for 2 hours, and thereafter, the temperature $T_1$ was held for a $T_1$-holding time shown in the table. Thereafter, the temperature was set to a temperature $T_2$, and then an alcohol component $A_2$ was added and the temperature $T_2$ was held for $T_2$-holding time shown in the table. Thereafter, the reaction was performed at 10 kPa until reaching a softening point shown in the table, thereby obtaining binder resin compositions A-1 to A-11 and A-52. Various properties were measured and shown in Table 1.

Comparative Examples A51, A53, and A54 [Binder Resin Compositions A-51, A-53, and A-54]

An alcohol component $A_1$, a carboxylic acid component, an esterification catalyst, and a polymerization inhibitor shown in Table 1 were placed in a four-necked flask having 10 L-capacity equipped with a dehydration tube equipped with a nitrogen inlet tube, a stirrer, and a thermocouple. After holding the temperature at 180° C. for 1 hour in a nitrogen atmosphere at atmospheric pressure, the temperature was raised to a temperature $T_1$ shown in the table for 2 hours, and thereafter, the temperature $T_1$ was held for a $T_1$-holding time shown in the table. Thereafter, the reaction was performed at 10 kPa until reaching a softening point shown in the table, thereby obtaining binder resin compositions A-51, A-53, and A-54. Various properties were measured and shown in Table 1.

TABLE 1

| | | | Example/Comparative Example | | | | | | | | |
|---|---|---|---|---|---|---|---|---|---|---|---|
| | | | Example A1 | | Example A2 | | Example A3 | | Example A4 | | Example A5 |
| | | | Binder resin composition | | | | | | | | |
| | | | A-1 | | A-2 | | A-3 | | A-4 | | A-5 |
| | | | Charge amount (g) | Parts by mol *3 | Charge amount (g) | Parts by mol *3 | Charge amount (g) | Parts by mol *3 | Charge amount (g) | Parts by mol *3 | Charge amount (g) | Parts by mol *3 |
| Raw material monomer | Carboxylic acid component | Fumaric acid | 2366 | 102 | 2366 | 102 | 2366 | 102 | 2227 | 96 | 2366 | 102 |
| | | Maleic acid | — | — | — | — | — | — | — | — | — | — |
| | | Terephthalic acid | — | — | — | — | — | — | — | — | — | — |
| | 1st step Alcohol component $A_1$ | BPA-PO *1 | 6300 | 90 | 6650 | 95 | 5600 | 80 | 6300 | 90 | 6300 | 90 |
| | | BPA-EO *2 | — | — | — | — | — | — | — | — | — | — |
| | 2nd step Alcohol component $A_2$ | BPA-PO *1 | 700 | 10 | 350 | 5 | 1400 | 20 | 700 | 10 | 700 | 10 |
| | | BPA-EO *2 | — | — | — | — | — | — | — | — | — | — |
| | Total amount of fumaric acid and maleic acid on the basis of 100 parts by mol of ($A_1 + A_2$) (parts by mol) | | 102 | | 102 | | 102 | | 96 | | 102 | |
| | Acid component/($A_1 + A_2$) | | 1.02 | | 1.02 | | 1.02 | | 0.96 | | 1.02 | |
| Process | 1st step | Temperature $T_1$ (° C.) | 210 | | 210 | | 210 | | 210 | | 220 | |
| | | $T_1$- holding time (h) | 3 | | 3 | | 3 | | 3 | | 3 | |
| | 2nd step | Temperature $T_2$ (° C.) | 190 | | 190 | | 190 | | 190 | | 190 | |
| | | $T_2$- holding time (h) | 2 | | 2 | | 2 | | 2 | | 2 | |
| | | | Charge amount (g) | Parts by mass *4 | Charge amount (g) | Parts by mass *4 | Charge amount (g) | Parts by mass *4 | Charge amount (g) | Parts by mass *4 | Charge amount (g) | Parts by mass *4 |
| Esterification catalyst | Monobutyltin oxide | | 9.4 | 0.1 | 9.4 | 0.1 | 9.4 | 0.1 | 9.4 | 0.1 | 9.4 | 0.1 |
| Polymerization inhibitor | Hydroquinone | | 1.9 | 0.02 | 1.9 | 0.02 | 1.9 | 0.02 | 1.9 | 0.02 | 1.9 | 0.02 |
| Properties | Softening point (° C.) | | 98.7 | | 97.6 | | 100.1 | | 99.1 | | 99.3 | |
| | Highest temperature of endothermic peak (° C.) | | 57.6 | | 57.1 | | 58.7 | | 57.0 | | 57.3 | |

TABLE 1-continued

| | Example A1 | Example A2 | Example A3 | Example A4 | Example A5 |
|---|---|---|---|---|---|
| Crystallinity | 1.71 | 1.71 | 1.71 | 1.74 | 1.73 |
| Glass transition temperature (° C.) | 56.1 | 55.3 | 57.2 | 55.3 | 56.2 |
| Number average molecular weight | 3600 | 3800 | 3400 | 3400 | 3600 |
| Weight average molecular weight | 16000 | 15000 | 18000 | 15000 | 18000 |
| Polydispersity (Mw/Mn) | 4.4 | 3.9 | 5.3 | 4.4 | 5.0 |
| Total content of fumaric acid and maleic acid (ppm by mass) | 450 | 600 | 500 | 400 | 450 |
| Acid value (mgKOH/g) | 20.5 | 21.5 | 19.4 | 16.1 | 21.4 |

| | | | Example/Comparative Example | | | | | | | | |
|---|---|---|---|---|---|---|---|---|---|---|---|
| | | | Example A6 | | Example A7 | | Example A8 | | Example A9 | | Example A10 |
| | | | \multicolumn{10}{c}{Binder resin composition} |
| | | | A-6 | | A-7 | | A-8 | | A-9 | | A-10 |
| | | | Charge amount (g) | Parts by mol *3 | Charge amount (g) | Parts by mol *3 | Charge amount (g) | Parts by mol *3 | Charge amount (g) | Parts by mol *3 | Charge amount (g) | Parts by mol *3 |
| Raw material monomer | Carboxylic acid component | Fumaric acid | 2366 | 102 | 2366 | 102 | 2088 | 90 | 2366 | 102 | 2366 | 102 |
| | | Maleic acid | — | — | — | — | 278 | 12 | — | — | — | — |
| | | Terephthalic acid | — | — | — | — | — | — | — | — | — | — |
| | 1st step Alcohol component $A_1$ | BPA-PO *1 | 5600 | 80 | 6300 | 90 | 6300 | 90 | 6860 | 98 | 4900 | 70 |
| | | BPA-EO *2 | 650 | 10 | — | — | — | — | — | — | — | — |
| | 2nd step Alcohol component $A_2$ | BPA-PO *1 | 700 | 10 | 700 | 10 | 700 | 10 | 140 | 2 | 2100 | 30 |
| | | BPA-EO *2 | — | — | — | — | — | — | — | — | — | — |
| | Total amount of fumaric acid and maleic acid on the basis of 100 parts mol by of ($A_1 + A_2$) (parts by mol) | | 102 | | 102 | | 102 | | 102 | | 102 | |
| | Acid component/($A_1 + A_2$) | | 1.02 | | 1.02 | | 1.02 | | 1.02 | | 1.02 | |
| Process | 1st step | Temperature $T_1$ (° C.) | 210 | | 210 | | 210 | | 210 | | 210 | |
| | | $T_1$- holding time (h) | 3 | | 3 | | 3 | | 3 | | 3 | |
| | 2nd step | Temperature $T_2$ (° C.) | 190 | | 210 | | 190 | | 190 | | 190 | |
| | | $T_2$- holding time (h) | 2 | | 2 | | 2 | | 2 | | 2 | |

| | | | Charge amount (g) | Parts by mass *4 | Charge amount (g) | Parts by mass *4 | Charge amount (g) | Parts by mass *4 | Charge amount (g) | Parts by mass *4 | Charge amount (g) | Parts by mass *4 |
|---|---|---|---|---|---|---|---|---|---|---|---|---|
| Esterification catalyst | Monobutyltin oxide | | 8.9 | 0.1 | 9.4 | 0.1 | 9.4 | 0.1 | 9.4 | 0.1 | 9.4 | 0.1 |
| Polymerization inhibitor | Hydroquinone | | 1.8 | 0.02 | 1.9 | 0.02 | 1.9 | 0.02 | 1.9 | 0.02 | 1.9 | 0.02 |
| Properties | Softening point (° C.) | | 100.3 | | 99.5 | | 97.6 | | 97.6 | | 98.7 | |
| | Highest temperature of endothermic peak (° C.) | | 56.8 | | 58.7 | | 57.2 | | 57.4 | | 58.1 | |
| | Crystallinity | | 1.77 | | 1.70 | | 1.71 | | 1.70 | | 1.70 | |
| | Glass transition temperature (° C.) | | 55.2 | | 57.0 | | 55.7 | | 56.1 | | 56.4 | |
| | Number average molecular weight | | 3900 | | 3600 | | 3800 | | 3500 | | 3300 | |
| | Weight average molecular weight | | 18000 | | 19000 | | 17500 | | 14000 | | 14000 | |
| | Polydispersity (Mw/Mn) | | 4.6 | | 5.3 | | 4.6 | | 4.0 | | 4.2 | |
| | Total content of fumaric acid and maleic acid (ppm by mass) | | 450 | | 400 | | 250 | | 700 | | 450 | |
| | Acid value (mgKOH/g) | | 18.1 | | 19.7 | | 20.8 | | 19.8 | | 19.4 | |

| | | | Example/Comparative Example | | | | | | | | |
|---|---|---|---|---|---|---|---|---|---|---|---|
| | | | Example A11 | | Comparative Example A51 | | Comparative Example A52 | | Comparative Example A53 | | Comparative Example A54 |
| | | | \multicolumn{10}{c}{Binder resin composition} |
| | | | A-11 | | A-51 | | A-52 | | A-53 | | A-54 |
| | | | Charge amount (g) | Parts by mol *3 | Charge amount (g) | Parts by mol *3 | Charge amount (g) | Parts by mol *3 | Charge amount (g) | Parts by mol *3 | Charge amount (g) | Parts by mol *3 |
| Raw material monomer | Carboxylic acid component | Fumaric acid | 2366 | 102 | 2366 | 102 | 2366 | 102 | 2366 | 102 | 2088 | 90 |
| | | Maleic acid | — | — | — | — | — | — | — | — | — | — |
| | | Terephthalic acid | — | — | — | — | — | — | — | — | 398 | 12 |

TABLE 1-continued

| | | | | | | | | | | | |
|---|---|---|---|---|---|---|---|---|---|---|---|
| | 1st step Alcohol component $A_1$ | BPA-PO *1 | 6300 | 90 | 7000 | 100 | 6300 | 90 | 7000 | 100 | 7000 | 100 |
| | | BPA-EO *2 | — | — | — | — | — | — | — | — | — | — |
| | 2nd step Alcohol component $A_2$ | BPA-PO *1 | 700 | 10 | — | — | 700 | 10 | — | — | — | — |
| | | BPA-EO *2 | — | — | — | — | — | — | — | — | — | — |
| | Total amount of fumaric acid and maleic acid on the basis of 100 parts by mol of $(A_1 + A_2)$ (parts by mol) | | 102 | | 102 | | 102 | | 102 | | 90 | |
| | Acid component/$(A_1 + A_2)$ | | 1.02 | | 1.02 | | 1.02 | | 1.02 | | 1.02 | |
| Process | 1st step | Temperature $T_1$ (° C.) | 210 | | 210 | | 190 | | 210 | | 230 | |
| | | $T_1$- holding time (h) | 3 | | 3 | | 3 | | 3 | | 3 | |
| | 2nd step | Temperature $T_2$ (° C.) | 220 | | — | | 190 | | — | | — | |
| | | $T_2$- holding time (h) | 2 | | — | | 2 | | — | | — | |

| | | Charge amount (g) | Parts by mass *4 | Charge amount (g) | Parts by mass *4 | Charge amount (g) | Parts by mass *4 | Charge amount (g) | Parts by mass *4 | Charge amount (g) | Parts by mass *4 |
|---|---|---|---|---|---|---|---|---|---|---|---|
| Esterification catalyst | Monobutyltin oxide | 9.4 | 0.1 | 9.4 | 0.1 | 9.4 | 0.1 | 9.4 | 0.1 | 9.5 | 0.1 |
| Polymerization inhibitor | Hydroquinone | 1.9 | 0.02 | 1.9 | 0.02 | 1.9 | 0.02 | 1.9 | 0.02 | 1.9 | 0.02 |
| Properties | Softening point (° C.) | 100.4 | | 99.8 | | 97.9 | | 109 | | 102 | |
| | Highest temperature of endothermic peak (° C.) | 58.1 | | 58.5 | | 56.9 | | 66.2 | | 55 | |
| | Crystallinity | 1.73 | | 1.71 | | 1.72 | | 1.65 | | 1.85 | |
| | Glass transition temperature (° C.) | 56.4 | | 56.3 | | 54.3 | | 64.5 | | 52.3 | |
| | Number average molecular weight | 4000 | | 3800 | | 4000 | | 5000 | | 3000 | |
| | Weight average molecular weight | 23000 | | 13500 | | 15000 | | 40000 | | 14000 | |
| | Polydispersity (Mw/Mn) | 5.8 | | 3.6 | | 3.8 | | 8.0 | | 4.7 | |
| | Total content of fumaric acid and maleic acid (ppm by mass) | 600 | | 1200 | | 1000 | | 250 | | 300 | |
| | Acid value (mgKOH/g) | 19.7 | | 21.0 | | 21.8 | | 9.1 | | 9.1 | |

*1 BPA-PO: Propylene oxide (2.2) adduct of bisphenol A
*2 BPA-EO: Ethylene oxide (2.2) adduct of bisphenol A
*3: Amount on the basis of 100 parts by mol of all of alcohol components (parts by mol)
*4: Amount on the basis of 100 parts by mass of the total amount of the alcohol component $A_1$, the alcohol $A_2$, and the carboxylic acid component (parts by mass)

Production Example H1 [Resin H-1]

An alcohol component, an acid component, an esterification catalyst, and a polymerization inhibitor shown in Table 2 were placed in a four-necked flask having 10 L-capacity equipped with a dehydration tube equipped with a nitrogen inlet tube, a stirrer, and a thermocouple. After holding the temperature at 180° C. for 1 hour in a nitrogen atmosphere at atmospheric pressure, the temperature was raised to a temperature $T_1$ shown in the table over 3 hours, and thereafter, the temperature $T_1$ was held for a $T_1$-holding time and shown in the table. Thereafter, the reaction was performed at 210° C. and 8.0 kPa for 1 hour. Then, the temperature was then set to a temperature $T_2$, trimellitic anhydride was added, and was held for a time shown in the table. Thereafter, the reaction was performed at 10 kPa until reaching a softening point shown in the table, thereby obtaining a resin H-1. Various properties were measured and shown in Table 2.

TABLE 2

| | | | Production Example H1 Resin H-1 | |
|---|---|---|---|---|
| | | | Charge amount (g) | Parts by mol *3 |
| Raw material monomer | Alcohol component | BPA-PO *1 | 4900 | 70 |
| | | BPA-EO *2 | 1950 | 30 |
| | 1st step Acid component | Fumaric acid | 1531 | 66 |
| | 2nd step Acid component | Trimellitic anhydride | 768 | 20 |
| Process | 1st step | Temperature $T_1$ (° C.) | 210 | |
| | | $T_1$-holding time (h) | 2 | |
| | 2nd step | Temperature $T_2$ (° C.) | 210 | |
| | | $T_2$-holding time (h) | 2 | |

TABLE 2-continued

| | | Production Example H1 Resin H-1 | |
|---|---|---|---|
| | | Charge amount (g) | Parts by mass *4 |
| Esterification catalyst | Monobutyltin oxide | 9.1 | 0.1 |
| Polymerization inhibitor | Hydroquinone | 1.8 | 0.02 |
| Properties | Softening point (° C.) | 134.5 | |
| | Highest temperature of endothermic peak (° C.) | 64.3 | |
| | Crystallinity | 2.09 | |
| | Glass transition temperature (° C.) | 61.5 | |
| | Number average molecular weight | 4300 | |
| | Weight average molecular weight | 60000 | |
| | Polydispersity (Mw/Mn) | 14.0 | |
| | Total content of fumaric acid and maleic acid (ppm by mass) | 100 | |
| | Acid value (mgKOH/g) | 25.6 | |

*1 BPA-PO: Propylene oxide (2.2) adduct of bisphenol A
*2 BPA-EO: Ethylene oxide (2.2) adduct of bisphenol A
*3: Amount on the basis of 100 parts by mol of all of alcohol components (parts by mol)
*4: Amount on the basis of 100 parts by mass of the total amount of the alcohol component $A_1$, the alcohol $A_2$, and the carboxylic acid component (parts by mass)

[Production of Toner]

Examples B1 to B12 and Comparative Examples B1 to B4

100 parts by mass of a binder resin mixed with a resin shown in Table 3, 5 parts by mass of a colorant "ECB-301" (manufactured by Dainichiseika Color & Chemicals Mfg. Co., Ltd. (Japan), C.I. Pigment Blue 15:3), 1 part by mass of a negatively chargeable charge control agent "LR-147" (manufactured by Japan Carlit Co., Ltd. (Japan)), and 2 parts by mass of a release agent NP-105 (manufactured by Mitsui Chemicals, Inc., a polypropylene wax, melting point: 140° C.) were thoroughly agitated with a Henschel mixer, and the mixture was melt-kneaded with a same-direction rotation type twin-screw extruder having a full length of kneading portion of 1,560 mm, a screw diameter of 42 mm, and a barrel inner diameter of 43 mm. A rotation speed of the roll was 200 r/min, a heating temperature in the roll was 120° C., a supply rate of the mixture was 10 kg/hr, and an average residence time was about 18 seconds. The obtained kneaded material was subjected to rolling and cooling with cooling rolls, and toner particles having a volume median particle diameter ($D_{50}$) of 6.5 μm were then obtained with a jet mill.

To 100 parts by mass of the obtained toner particles, 1.0 part by mass of hydrophobic silica "Aerosil R-972" (manufactured by Nippon Aerosil Co., Ltd. (Japan)) and 1.0 part by mass of hydrophobic silica "SI-Y" (manufactured by Nippon Aerosil Co., Ltd. (Japan)) were added as external additives and mixed in a Henschel mixer at 3,600 r/min for 5 minutes, to perform the treatment with external additives, thereby obtaining a toner having a volume median particle diameter ($D_{50}$) of 6.5 μm.

[Evaluation]
[Low-Temperature Fusing Property]

The obtained toner was mounted in a copier "AR-505" (manufactured by Sharp Corporation (Japan)) to obtain an unfused image (2 cm×12 cm) having an amount of the toner deposited of 0.7 mg/cm². Using a fuser of a copier "AR-505" (manufactured by Sharp Corporation (Japan)), which had been modified so as to be fusable offline (fusing rate: 200 mm/sec), a fusing test was performed at each fusing temperature while successively increasing the fusing temperature at intervals of 5° C. from 90° C. to 240° C. "CopyBond SF-70NA" (manufactured by Sharp Corporation (Japan), 75 g/m²) was used as a fused paper.

An image which had been allowed to pass through the fuser was rubbed by moving a sand-rubber eraser having a bottom size of 15 mm×7.5 mm, to which a load of 500 g was applied, backward and forward five times, and optical reflection densities before and after rubbing were measured with a reflection densitometer "RD-915" (manufactured by Macbeth (Switzerland)), and the temperature of the fusing roll at which a ratio therebetween (after rubbing/before rubbing) initially exceeded 70% was defined as a lowest fusing temperature, thereby evaluating the low-temperature fusing property.

[Heat-Resistant Storage Stability]

A cylindrical container having a radius of 12 mm was charged with 10 g of the toner, a weight of 100 g was placed from the upper side, and the container was kept in an environment at 50° C. and a relative humidity of 60% for 72 hours. On a powder tester (manufactured by Hosokawa Micron Corporation (Japan)), three sieves of a sieve A (opening: 250 μm), a sieve B (opening: 150 μm), and a sieve C (opening: 75 μm) were superimposed in this order from the upper side, and 10 g of the toner was placed on the sieve A and vibrated for 60 seconds. A mass WA (g) of the toner remaining on the sieve A, a mass WB (g) of the toner remaining on the sieve B, and a mass WC (g) of the toner remaining on the sieve C were measured, respectively, and the heat-resistant storage stability was evaluated on the basis of a value (α) calculated according to the following formula. As the value (α) is closer to 1, the heat-resistant storage stability is more excellent.

$$\alpha = 1 - (WA + WB \times 0.6 + WC \times 0.2)/10$$

[Durability]

The toner was mounted in a developing device "PAGEPRESTO N-4" (manufactured by Casio Computer Co., Ltd. (Japan), fusing: contact fusing system, development: non-magnetic one-component development system, developing roll diameter: 2.3 cm), and a diagonal stripe pattern having a blackening rate of 5.5% was continuously printed in an environment at a temperature of 32° C. and a relative humidity of 85%. On the way, a black solid image was printed for every 500 sheets, and the presence or absence of a stripe on the image was confirmed. The printing was stopped at the point of time when the stripe was generated and performed up to 9,000 sheets at maximum. The number of printed sheets up to the point of time when the stripe was visually confirmed on the image was defined as the number of sheets at which the stripe was generated due to coalescence or deposition of the toner on the developing roll, and the durability was evaluated. As the numerical value is larger, the durability of the toner is more excellent.

[Image Density]

The toner was mounted in a copier "AR-505" (manufactured by Sharp Corporation (Japan)), and an image in an unfused image state (printed area: 2 cm×12 cm, deposited amount: 0.5 mg/cm²) was taken out. A fuser of the copier was fused offline on a paper at 160° C. and 200 mm/sec. "CopyBond SF-70NA" (manufactured by Sharp Corporation (Japan), 75 g/m²) was used as the fused paper.

An image density of the fused image was measured with a transmission densitometer "TR-927" (manufactured by GretagMacbeth). The reason why the transmission densitometer was used for the measurement of the image density resides in the matter that when a reflection densitometer is used, the density is immediately saturated at a fixed value or more, whereas the transition densitometer susceptibly senses dispersing, etc. of the colorant. As the image density is higher, the image density is more excellent.

TABLE 3

| | Binder resin | | | | Evaluation | | | |
| | Resin composition A | | Resin H | | | | | |
| | Resin No. | Amount (parts by mass) | Resin No. | Amount (parts by mass) | Low-temperature fusing property [° C.] | Heat-resistant storage stability (α) | Durability [number of sheets] | Image density |
|---|---|---|---|---|---|---|---|---|
| Example B1 | A-1 | 100 | — | — | 120 | 0.96 | 8000 | 2.0 |
| Example B2 | A-2 | 100 | — | — | 125 | 0.97 | 6000 | 1.8 |
| Example B3 | A-3 | 100 | — | — | 125 | 0.81 | 7500 | 2.0 |
| Example B4 | A-4 | 100 | — | — | 120 | 0.75 | 6000 | 1.9 |
| Example B5 | A-5 | 100 | — | — | 130 | 0.98 | 7500 | 1.9 |
| Example B6 | A-6 | 100 | — | — | 125 | 0.73 | 7000 | 2.0 |
| Example B7 | A-7 | 100 | — | — | 130 | 0.89 | 7000 | 2.0 |
| Example B8 | A-1 | 40 | H-1 | 60 | 145 | 0.95 | 8500 | 2.0 |
| Example B9 | A-8 | 100 | — | — | 125 | 0.94 | 7000 | 1.8 |
| Example B10 | A-9 | 100 | — | — | 130 | 0.60 | 4000 | 1.6 |
| Example B11 | A-10 | 100 | — | — | 125 | 0.60 | 4000 | 1.8 |
| Example B12 | A-11 | 100 | — | — | 135 | 0.87 | 7500 | 1.8 |
| Comparative Example B1 | A-51 | 100 | — | — | 125 | 0.50 | 2000 | 1.3 |
| Comparative Example B2 | A-52 | 100 | — | — | 130 | 0.30 | 1000 | 1.2 |
| Comparative Example B3 | A-53 | 100 | — | — | 150 | 0.95 | 6000 | 1.9 |
| Comparative Example B4 | A-54 | 100 | — | — | 145 | 0.75 | 2000 | 1.7 |

In the light of the above, in comparison between the Examples and the Comparative Examples, it can be understood that the toners using the binder resin compositions of the Examples exhibit excellent results with respect to all of low-temperature fusing property, heat-resistant storage stability, durability, and image density, as compared with the toners using the binder resin compositions of the Comparative Examples.

The invention claimed is:

1. A method for producing a binder resin composition, comprising the following steps (1) and (2):

step (1): mixing an aromatic alcohol $A_1$ comprising an alkylene oxide adduct of bisphenol A and at least one carboxylic acid compound selected from fumaric acid and maleic acid, wherein said mixing is performed at a temperature $T_1$ of 200° C. or higher and lower than 230° C. for 2 hours or more and less than 5 hours; and step (2): further adding an aromatic alcohol $A_2$ comprising an alkylene oxide adduct of bisphenol A to the mixture obtained in the step (1) and mixing until a softening point of the resin in the system falls within a range of 90° C. or higher and 105° C. or lower, wherein the binder resin composition comprises a polyester resin having an acid value of 14 mgKOH/g or more and 30 mgKOH/g or less, and a total content of fumaric acid and maleic acid is 700 ppm by mass or less relative to the binder resin composition; and in the steps (1) and (2), a total amount of fumaric acid and maleic acid is 95 parts by mol or more and 105 parts by mol or less on the basis of 100 parts by mol of a total amount of the aromatic alcohol $A_1$ and the aromatic alcohol $A_2$.

2. The method for producing a binder resin composition according to claim 1, wherein a molar ratio ($A_1/A_2$) of the amount of the aromatic alcohol $A_1$ in the step (1) and the amount of the aromatic alcohol $A_2$ in the step (2) is 65/35 or more and 99/1 or less.

3. The method for producing a binder resin composition according to claim 1, wherein the step (2) is a step of further adding the aromatic alcohol $A_2$ at a temperature $T_2$ of 180° C. or higher and lower than 225° C.

4. A toner for development of electrostatic images, comprising the binder resin composition obtained by the production method according to claim 1.

5. A binder resin composition comprising a polyester resin that is a polycondensate of an alcohol component comprising an alkylene oxide adduct of bisphenol A and a carboxylic acid component comprising at least one carboxylic acid compound selected from fumaric acid and maleic acid, wherein the polyester resin has an acid value of 14 mgKOH/g or more and 30 mgKOH/g or less, and in the binder resin composition, a total content of fumaric acid and maleic acid is 700 ppm by mass or less relative to the binder resin composition, and a total amount of fumaric acid and maleic acid is 95 parts by mol or more and 105 parts by mol or less on the basis of 100 parts by mol of a total amount of the alcohol component.

6. The method for producing a binder resin composition according to claim 1, wherein the alkylene oxide adduct of bisphenol A in the aromatic alcohols $A_1$ and $A_2$ is represented by a formula (I):

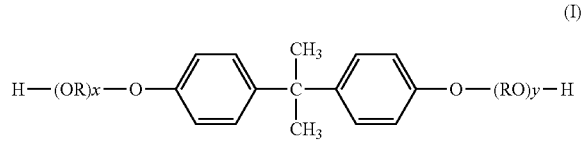

(I)

wherein OR and RO are each an oxyalkylene group; R is at least one selected from an ethylene group and a propylene group; x and y are each an average addition molar number of the alkylene oxide and a positive number, and a value of the sum of x and y is in a range of 1 to 16.

7. The method for producing a binder resin composition according to claim 1, wherein said at least one carboxylic acid compound comprises fumaric acid.

8. The method for producing a binder resin composition according to claim 1, wherein said at least one carboxylic acid compound comprises maleic acid.

9. The method for producing a binder resin composition according to claim 1, wherein a molar ratio ($A_1/A_2$) of the amount of the aromatic alcohol $A_1$ in the step (1) and the amount of the aromatic alcohol $A_2$ in the step (2) is 70/30 or more and 98/2 or less.

* * * * *